United States Patent
Birenback et al.

(10) Patent No.: US 6,594,704 B1
(45) Date of Patent: Jul. 15, 2003

(54) METHOD OF MANAGING AND USING MULTIPLE VIRTUAL PRIVATE NETWORKS IN A ROUTER WITH A SINGLE ROUTING TABLE

(75) Inventors: Michael Birenback, Acton, MA (US); Mark Duffy, Lexington, MA (US); Sanjay Krishnan, Arlington, MA (US)

(73) Assignee: Quarry Technologies, Burlington, MA (US)

( * ) Notice: Subject to any disclaimer, the term of this patent is extended or adjusted under 35 U.S.C. 154(b) by 0 days.

(21) Appl. No.: 09/461,957

(22) Filed: Dec. 15, 1999

(51) Int. Cl.[7] ............................................. G06F 15/173
(52) U.S. Cl. ...................... 709/238; 709/242; 709/245; 709/249; 711/206; 711/207
(58) Field of Search ................ 709/238, 245, 709/249, 242; 711/206, 207

(56) References Cited

U.S. PATENT DOCUMENTS

| | | | | |
|---|---|---|---|---|
| 5,386,413 A | * | 1/1995 | McAuley et al. | 370/392 |
| 5,606,650 A | * | 2/1997 | Kelley et al. | 345/428 |
| 5,809,563 A | * | 9/1998 | Yamada et al. | 711/207 |
| 6,160,811 A | * | 12/2000 | Partridge et al. | 370/359 |
| 6,205,488 B1 | * | 3/2001 | Casey et al. | 709/238 |
| 6,226,751 B1 | * | 5/2001 | Arrow et al. | 370/351 |
| 6,339,595 B1 | * | 1/2002 | Rekhter et al. | 370/392 |
| 6,426,955 B1 | * | 7/2002 | Gossett Dalton, Jr. et al. | 370/401 |
| 6,438,612 B1 | * | 8/2002 | Ylonen et al. | 709/249 |
| 6,526,056 B1 | * | 2/2003 | Rekhter et al. | 370/392 |
| 2003/0018876 A1 | * | 1/2003 | Zahir et al. | 711/206 |

* cited by examiner

Primary Examiner—Nabil El-Hady
(74) Attorney, Agent, or Firm—Fish & Richardson P.C.

(57) ABSTRACT

A method of maintaining multiple routing tables within a global table of a network router including the steps of providing the router with a route table generator to maintain the global table, and a forwarding engine to perform table lookups, the performing of table lookups in one of the multiple routing tables of the global table using a key, the key representing an index into the one of said multiple routing tables within said global table, the key created by combining a virtual private network identification (VPN ID) and an address prefix, and maintaining a plurality of table entries in the global table by using the key as a pointer to one of said table entries.

13 Claims, 1 Drawing Sheet

METHOD OF MANAGING AND USING MULTIPLE VIRTUAL PRIVATE NETWORKS IN A ROUTER WITH A SINGLE ROUTING TABLE

FIELD OF THE INVENTION

The present invention relates to the field of telecommunications, and more particularly to an improved system and method of searching.

BACKGROUND OF THE INVENTION

As is known, the Internet is a packet network, where each data packet is passed from a network device referred to as a router to the next in the chain, until it reaches its destination. Typically, as a packet moves through the network, each router performs packet forwarding decisions independent of other routers and other packets. Internet Protocol (IP) is the networking language of the Internet, and routers are the principal engines of IP. IP routers have to perform a per-packet lookup in a routing table to determine where IP packets are to be forwarded.

Within a router, a route entry essentially consists of two parts—an address prefix to next hop mapping (at the IP layer) and the knowledge of what link is available to that next hop. These two pieces of information are sufficient to route packets. A packet enters the router with a destination address in the IP header. The router performs a lookup of its routing table with this destination address as the key. The routing table itself is essentially an address prefix to next hop mapping. Hence, given a destination address, the router selects an address prefix entry in the routing table to determine the next hop router that this packet must be handed to. The routing table entry also indicates what link to send the packet out on (to this next hop).

Typically the router receives millions of packets per second and for efficient and fast forwarding, the need for a high speed destination prefix lookup is essential. The destination address in a given packet may match multiple prefixes in the routing table and so the router is required to find the most specific match from a large number of patterns.

Several schemes for better router data throughput and faster packet forwarding have been proposed in recent years in order to perform Internet Protocol (IP) lookups in an optimized manner. Most applications require the retrieved information be associated with the best matching prefix (BMP), if any, of the input string. For example, if the string "MART" is the input string to a database, and the database holds information associated with the strings "M", "MA", and "MAL", the best matching prefix to "MART" is the string "MA", and the information associated with "MA" should be returned. Note that "M" is also a prefix of "MART", but "MA" is a better (i.e. longer) prefix than "M". BMP searching is typically performed by a database having a hierarchical, tree-like structure. This type of database is often called a trie. A trie database allows both exact matching (i.e. searching for a string that is exactly equal to the input string) as well as best prefix.

IP lookups that use BMP can be performed in either software or hardware. An example of a software approach, as mentioned above, is to involve a tree-based method using Patricia, i.e., radix, trees, or binary trees. An example of a hardware approach is to involve the use of Content Addressable Memories (CAMs).

A typical router has two main forwarding functions, i.e., address lookup (to lookup a destination address) and message switching (sending the packet to the correct output link). The problem of accomplishing address lookups at gigabit speeds is ever increasing. With the emergence of high-speed links, like OC-48 and higher (An OC-48 link can deliver packets at up to 2.5 million packets per second assuming an average of 1,000 bit per packet) to the router, it is essential that packet forwarding keep up with this rate. Otherwise packet forwarding (route lookup, etc.) could act as a bottleneck essentially degrading the performance of the router.

Complicating matters is greater usage of virtual private networks. A virtual private network (VPN) is a private data network that makes use of the public telecommunication infrastructure, maintaining privacy through the use of a tunneling protocol and security procedures. A virtual private network can be contrasted with a system of owned or leased lines that can only be used by one company. The idea of the VPN is to give the company the same capabilities at much lower cost by using the shared public infrastructure rather than a private one. Phone companies have provided secure shared resources for voice messages. A virtual private network makes it possible to have the same secure sharing of public resources for data. Companies today are looking at using private virtual networks for both extranets and wide-area intranets.

An extranet is a private network that uses the Internet protocols and the public telecommunication system to securely share part of a business's information or operations with suppliers, vendors, partners, customers, or other businesses. An extranet can be viewed as part of a company's intranet that is extended to users outside the company.

An intranet is a private network that is contained within an enterprise. It may consist of many interlinked local area networks and also use leased lines in the wide area network. Typically, an intranet includes connections through one or more gateway computers to the outside Internet. The main purpose of an intranet is to share company information and computing resources among employees. An intranet can also be used to facilitate working in groups and for teleconferences. An intranet may use TCP/IP, HTTP, and other Internet protocols and in general look like a private version of the Internet.

As is well known, implementation of multiple VPNs in a single router has typically complicated address lookup since each VPN must have its own routing table, necessitating a large amount of table space within a single router to implement these individual routing tables. Also, dividing the available table space into dedicated areas for each VPN creates fragmentation and therefore inefficient use of the available space.

What is needed is a new and improved system and method of managing multiple VPN routing tables within a single shared space to maintain efficiency and speed of lookups, and correspondingly, efficiency and speed of packet forwarding.

SUMMARY OF THE INVENTION

In accordance with the principles of the present invention a method of maintaining multiple routing tables within a global table of a network router is provided including the steps of providing the router with a route table generator to maintain the global table, and a forwarding engine to perform table lookups, the performing of table lookups in one of the multiple routing tables of the global table using a key, the key representing an index into the one of said multiple routing tables within said global table, the key created by combining a virtual private network identification (VPN ID) and a packet destination address, and maintaining a plurality of table entries in the global table by using the key as a pointer to one of said table entries.

BRIEF DESCRIPTION OF THE DRAWINGS

The novel features believed characteristic of the invention are set forth in the appended claims. The invention itself, however, as well as features and advantages thereof, will be best understood by reference to the detailed description of specific embodiments which follows, when read in conjunction with the accompanying drawings, wherein:

DESCRIPTION OF THE PREFERRED EMBODIMENT(S)

Figure 1:
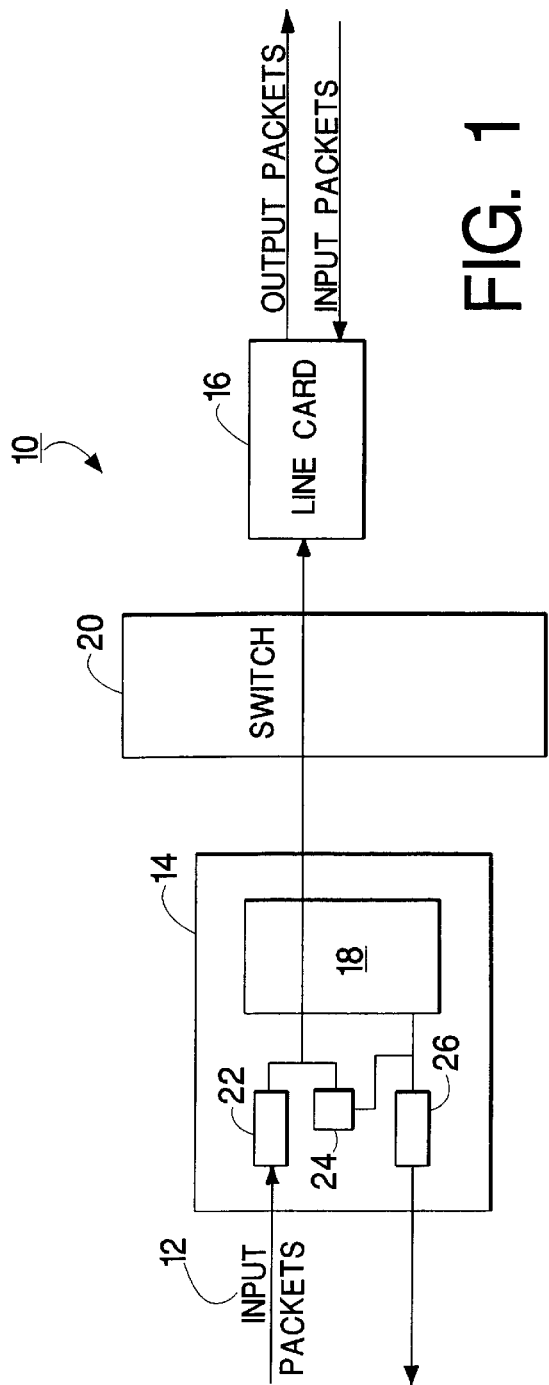
FIG. 1 is a block diagram of an exemplary network router.

Referring now to FIG. 1, a simplified block diagram of an exemplary router 10 is shown to illustrate a data processing path for a stream of input packets 12 entering from a line card 14 and exiting from a line card 16. The exemplary router 10 consists of multiple line cards, 14 and 16, each supporting one or more network interfaces (not shown). Line card 14 is shown to include a Forwarding Engine (FE) 18. Line card 14 and line card 16 are plugged into a high-speed switch 20. By way of example, when a packet 22 arrives at the line card 14, its header 24 is removed and passed to the forwarding engine 18. The Forwarding Engine 18 reads the header 24 to determine how to forward the packet 22 and then updates the header 24 and sends the updated header and its forwarding instructions back. The line card 14 integrates the new header with the rest of the packet 22 and sends the entire packet 22 through the switch 20 to the line card 16 for transmission. A Network Processor (NP) 26 provides basic management functions such as link up/down management and generation of Forwarding Engine routing tables for the router 10.

The router 10 contains a routing table on the Network Processor (NP) 26; the routes are contained in an IP Forwarding Database. The IP Forwarding Database contains next hop IP address, interface to get to the next hop, etc. The majority of Forwarding decision is done in the FE 18. The Forwarding Engine 18 is a hardware module that performs lookups (on the incoming packet) of the routing table. The routing table is maintained by software running on the Network Processor 26 called the Route Table Generator (RTG). Routers typically save table size by summarizing several address entries by using a single prefix entry. With such an arrangement, best matching prefix (BMP) is used to solve the problem of possibly multiple prefixes matching a given address.

As mentioned previously, the term virtual private network (VPN) is used in many different ways and can mean different things to different people. To best understand what a VPN is, it helps to also have a clear definition of both a private network and a public network.

A private network dedicates all network components (leased or owned) to a single customer. A public network shares one or more network components among multiple customers. A virtual private network (VPN) uses a public network, along with encryption, tunneling (encapsulation), and authentication, to achieve the same level of security and privacy as a private network. Virtual private networks are used in two primary ways. First, VPNs can connect two networks. This is typically referred to as a LAN-to-LAN VPN or a site-to-site VPN. Second, a remote access VPN can connect a remote user to a network. A remote access VPN replaces the need for a private network. In a VPN, one organizations/data travel over the same Internet as everyone else s no additional physical network is created. But, because the data is encrypted and only authenticated and authorized users can access the data, a virtual network that is private and secure exists. In fact, VPNs on the Internet are thought by some to be more secure than WANs that do not employ data encryption.

When implementing a single VPN within the router 10, for example, a single routing table is maintained, allowing use of a single address space to create and maintain the table. When implementing more than one VPN within the router 10, a virtual router, which is one of the elements of VPN, is created for each supported VPN. A virtual router is one of (possibly) multiple logical routers manifested within one physical router unit. Within the virtual router, prior to the present invention, each of the VPNs would necessitate the creation and maintenance of its own separate routing table for destination address lookups. The implementation of multiple routing tables results in fragmentation of memory space, such that memory space in the machine must be devoted to the routing table of one virtual router or another. Since memory space is finite, flexible use of memory space is one motivation behind the present invention.

Hence, if a router is supporting five VPNs, it needs six routing tables, i.e., one routing table for each VPN and one routing table for a global prefix table. The RTG is capable of maintaining multiple routing tables, restricted only by memory limitations. Configuration of the IP protocol stack assigns virtual private network identifications (VPN IDs) to each VPN. Each route entry in a router is part of a VPN ID, where VPN ID=0 represents the global prefix space in the internet.

Figure 2:
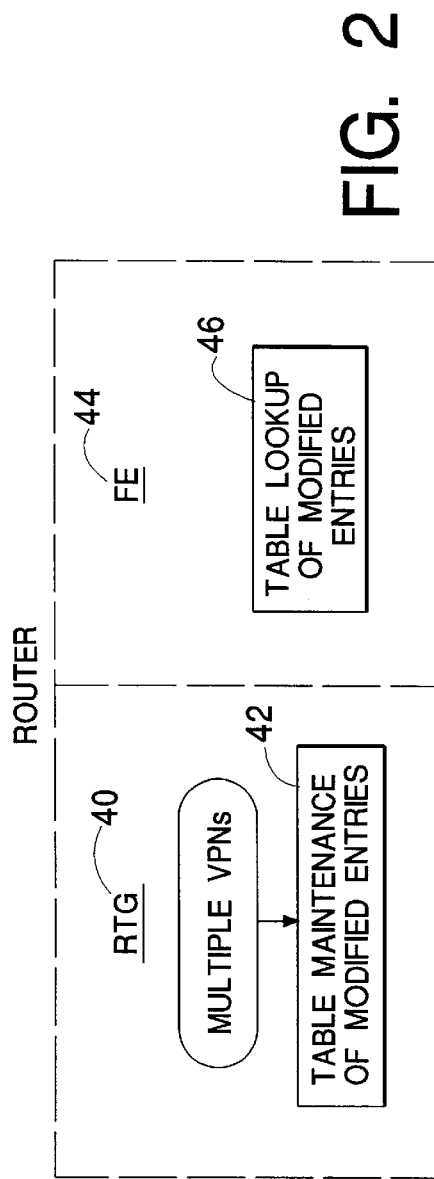
FIG. 2 is a block diagram of route table generator and forwarding engine of the router of FIG. 1 in accordance with the principles of the present invention.

The present invention allows the creation and management of a single, integrated routing table for support of multiple VPNs. Referring to FIG. 2, a high level block diagram of the operation and implementation is shown. As mentioned above, an Route Table Generator (RTG) 40 creates and maintains a single routing table 42, i.e., the RTG 40 adds, deletes, and modifies entries within the table 42. Entries within the table 42 are typically prefixes, and standard methods of creating prefix entries are employed. However, each of the table entries utilized in the present invention is placed in the table 42 by an index resulting from a hashed combination of the prefix with a VPN ID, more fully described below.

A forwarding engine (FE) 44 (sometimes referred to as a forwarding process) is a hardware/software module that performs one or more hash lookups 46 (on behalf of the incoming packet) of the routing table 42 in accordance with any one of a number of table lookup algorithms. When a packet is received, a VPN ID is associated with the packet based on the context in which the packet was received (using standard techniques well known in this art). Next, a portion of a destination address is combined with the VPN ID, as is done by the RTG 40 in maintaining the table 42, described fully below; this combination of VPN ID and a portion of the destination address is then hashed to obtain an index into the table whereupon best matching prefix (BMP) lookups 46 can occur utilizing standard BMP algorithms. Thus, the present invention manages one table which can effectively service multiple VPNs by defining keys into a table, through the use of VPN ID and prefix, thus resulting in managing a number of sub-tables, each supported within the single table.

The RTG 40 adds entries to routing tables corresponding to particular virtual routers, each of which is hashed. The present invention combines the address prefix with VPN ID, which yields the hashed location within the combined table, for the specific table entry.

When a packet is received, the FE performs a number of hashed lookups in accordance with the route lookup algorithm utilized. At each hash lookup, the combination of VPN ID and destination address are used as search keys.

As can be seen above, the RTG uses a specific combination of VPN ID and prefix as a key to entries within the table, allowing the table to be maintained. This same specific combination of VPN ID and a portion of the destination address of a received packet is used by the FE is to find appropriate entries in the table so that a BMP algorithm can find the appropriate match and result in forwarding the packet to the correct destination within the correct VPN.

The present invention utilizes the following method in the RTG to maintain the forwarding prefix table and by the FE to find the appropriate table entries associated with a specific VPN. The method involves performing an arithmetic function of the VPN ID and the destination address. Although a specific example will be described here which involves manipulating the VPN ID and destination address with a bitwise OR, one skilled in this art will see that any suitable arithmetic operation may be performed which will result in the same intended result. Thus, by way of one illustrative example, in the RTG, a key into the table is created as follows: Each route entry to be added has an associated VPN ID which identifies the virtual router to which the route entry belongs. The VPN ID is an 8-bit value, which is left shifted 24 bits. This shifted VPN ID is then combined with a prefix by using a bitwise OR. The resulting value is used as a key into the table of prefixes for purposes of adding, changing, or deleting a route entry.

In the FE, a packet is received. The VPN ID, which is based on the context of where the packet has arrived from, is determined. The VPN ID is an 8-bit value, which is left shifted 24 bits. Using a bitwise OR of the shifted VPN ID and a portion of the destination address of the received packets results in a key into the forwarding prefix table.

Having described a preferred embodiment of the invention, it will now become apparent to those skilled in the art that other embodiments incorporating its concepts may be provided. It is felt therefore, that this invention should not be limited to the disclosed invention, but should be limited only by the spirit and scope of the appended claims.

What is claimed is:

1. A method comprising:
   providing a router with a route table for routing incoming packets to multiple virtual private networks (VPNs); generator to maintain a global table, and a forwarding engine to perform table lookups, the performing of the table lookups in the global table using a key, the key representing an index pointing into the global table, the key generated by combining a virtual private network identification (VPN ID) of a packet and a portion of the packet; and
   maintaining a plurality of table entries in the global table by using the key as a pointer to one of the table entries.

2. The method according to claim 1 wherein identifying the VPN is determined from a context of where the packet arrived from.

3. The method according to claim 1 wherein generating the key pointing into the global table of entries comprises performing a mathematical operation on the VPN ID and the portion of the packet, the portion of the packet being a segment of a destination address of the packet.

4. A method for routing a packet in a virtual router servicing multiple private networks comprising:
   receiving a packet on an input port of a virtual router;
   identifying a virtual private network identification (VPN ID) of the packet;
   identifying a portion of the packet;
   generating a key that points into a global table of entries, the key combining the portion of the packet and the VPN ID;
   performing a search within the global table of entries by using the key as an offset into a specific location of the global table to determine a best matching prefix (BMP); and
   routing the packet to an output port of the virtual router in accordance with the results of performing the search.

5. A method comprising:
   maintaining a plurality of entries in a global routing table supporting multiple virtual private networks (VPNs), each of the entries using an access key for access, the access key being a combination of a VPN identification (ID) and a prefix;
   receiving a plurality of packets into a router;
   identifying a VPN ID of each of the packets;
   identifying a portion of a destination address of each of the packets;
   combining the VPN ID and the portion of the destination address to produce a key;
   performing a search using the key as an index into the global routing table; and
   routing each of the packets in accordance with the search results.

6. The method according to claim 5 wherein identifying a VPN ID of each of the packets comprises identifying a context of each of the packet.

7. The method according to claim 5 wherein combining the VPN ID and the portion of the destination address to produce a key comprises performing an arithmetic operation on the VPN ID and the portion of the destination address.

8. The method according to claim 7 wherein performing an arithmetic operation comprises:
   left shifting the VPN ID; and
   performing a mathematical operation on the shifted VPN ID and the portion of the destination address.

9. A method comprising:
   in a network, receiving a packet in a routing system servicing a plurality of virtual private networks (VPNs);
   generating a key from a VPN identification (VPN ID) of the received packet; and a portion of the received packet; and
   determining an entry in a global routing table having port addresses of next hops for said plurality of VPNs using the key.

10. The method according to claim 9, wherein the portion of the received packet is a segment of a destination address of the packet.

11. The method according to claim 9, wherein the entry is a port address of a next hop.

12. The method according to claim 9, further comprising sending the packet out to a port corresponding to the entry in the table.

13. A method comprising
- receiving a packet on an input port of a router; supporting a plurality of virtual private networks (VPNs);
- generating a key that points into a global table of entries representing addresses for said plurality of VPNs, the key combining a portion of the packet and a virtual private network identification (VPNs) VPN ID;
- determining a match of the key against a location in the global table; and
- sending the packet to an output port of the router corresponding to the match.

* * * * *

UNITED STATES PATENT AND TRADEMARK OFFICE
CERTIFICATE OF CORRECTION

PATENT NO. : 6,594,704 B1  
DATED : July 15, 2003  
INVENTOR(S) : Michael Birenbach, Mark Duffy and Sanjay Krishnan It is certified that error appears in the above-identified patent and that said Letters Patent is hereby corrected as shown below:

<u>Title page,</u>  
Item [12], "Birenback" should be spelled -- Birenbach --.  
Item [75], Inventors:, "Birenback" should be spelled -- Birenbach --.

Signed and Sealed this

Twenty-fifth Day of November, 2003

JAMES E. ROGAN  
*Director of the United States Patent and Trademark Office*